Patented Jan. 19, 1932

1,841,895

UNITED STATES PATENT OFFICE

ALPHONS O. JAEGER AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PURIFICATION OF COAL TAR CRUDES

No Drawing. Application filed January 9, 1929. Serial No. 331,389.

This invention relates to the purification of coal tar crudes, and particularly to coal tar crudes such as crude anthracene, which contain water.

Coal tar crudes which are normally solids, such as naphthalene, those containing acenaphthene and fluorene, and crude anthracene, are normally contaminated with water, as many of them are hygroscopic. The ordinary processes of purification, especially for anthracene, acenaphthene, and fluorene, involve recrystallization from solvents. In such processes the water content of the crude is a very serious drawback. The water tends to form a dispersion with the solvent, and undissolved components of the crude which renders crystallization difficult, especially when repeated filtering is necessary. There is also a tendency for the water to form an azeotropic mixture with the solvent, which either results in heavy losses of solvent during the dissolving of the crude at the usual elevated temperature or necessitates operating at a very low temperature, which is undesirable in most cases as it decreases the amount of material which can be dissolved in a given amount of solvent. The vapors of the azeotropic water-solvent mixtures may also frequently constitute quite a serious fire hazard. The most serious disadvantage of the presence of water, however, lies in the fact that it tends to cause the formation of slimes on crystallization, which impedes filtration and renders the whole purification difficult.

According to the present invention the disadvantages involved in the ordinary processes are avoided. The coal tar crude is heated to a temperature below preferably its boiling point, but well above the boiling point of water, until all of the water is removed. The dry crude, preferably while still molten, is then introduced into the solvent, being preferably at a temperature sufficient to raise the temperature of the solution to that desired for best results. In many cases, especially with the highest melting coal tar crudes, it may be necessary to cool down somewhat in order to avoid boiling off of the solvent. In some cases the heat content of the crude may be insufficient to bring the solution to the desired temperature, in which case additional heat is supplied but the amount is less than when the present invention is not used.

The process of the present invention not only completely eliminates all of the difficulties inherent in the former processes and avoids the hazards of fire and injury due to handling the material, which is frequently of a nature which irritates the skin, but a very rapid and efficient solution is effected since the coal tar crude is normally in a molten condition and is sufficiently hot so that when run into the solvent the mixture is rapidly brought up to the desired temperature. The rapid solution, of course, permits operating more economically and greatly increases the output from a given size of equipment and the quality of the product.

The dehydrating of the crude may be effected in a discontinuous or batch process, in connection with which it might be added that the molten dry crude may of course be stored at sufficiently high temperatures to keep it free from moisture. It is frequently desirable, however, to effect dehydration and introduction into the crystallizing equipment in a continuous, or semi-continuous, manner. This may be effected by using a deep dehydrating kettle or permitting the solid crude to drop on the surface of the molten crude in the still continuously in small amounts, for example, by feeding it with a screw, or any other suitable means, the dehydrated crude being drawn off from the bottom of the still. When suitably arranged this process is entirely continuous as the amount of cold solid crude added is small compared to the total volume of molten crude in the dehydrating kettle and is therefore almost immediately heated up to a temperature at which the water escapes in the form of vapor and by the time it has reached the bottom of the kettle it is thoroughly dried. The kettle may be heated by any suitable means, in some cases it being preferable to use either steam heating, or, in the case of crude anthracene, heating by means of a high boiling mineral oil. In many cases however direct firing may be used.

The invention is not only applicable to the coal tar crudes which are normally solids, but is also applicable to certain of the high boiling liquid crudes, such as anthracene oil and the like, from which the solid component is to be precipitated by a suitable diluent. It is an advantage of the present invention that some of these liquid crudes, such as anthracene oil, which are considerably cheaper than solid crude anthracene, may be used despite the fact that they are normally quite heavily contaminated with water, which would render their use otherwise economically and technically impracticable.

The invention will be described in connection with the following specific examples, which illustrate a few typical embodiments but do not limit the invention to the exact details therein set forth.

*Example 1*

The crude forerunnings of anthracene oil, containing fluorene or acenaphthene, or both, are introduced into a jacketed kettle or a vessel provided with internal heating coils, and is then heated to a temperature of about 150° C. until all of the water present has been distilled off. It is desirable to condense the water vapors leaving the still in a suitable condenser so that any valuable products volatilized at the same time or forming azeotropic mixtures with water vapors can be recovered and returned to a subsequent batch. The molten still contents, after dehydration, are then run off through a steam jacketed line, slowly dropping into a dissolving vessel containing 15–20 parts by volume of benzol, toluol or other liquid aromatic hydrocarbons. The crystallization proceeds as in the usual process, the temperature of the molten crude being sufficient to raise the whole mixture to the desired temperature for most effective solution.

*Example 2*

Crude naphthalene as obtained by the distillation of light oil or the creosote oil fractions of coal tar is melted in a still and heated to a temperature of 110–120° C. as long as the mixture of naphthalene and water vapors continues to be evolved. These vapors are led to a condenser, which is cooled by hot water held above the melting point of naphthalene. The condensed water-naphthalene mixture is run into a reservoir where it is cooled, and the naphthalene crystallizing out is filtered off and returned to a subsequent batch. The naphthalene remaining in the still is held at about 100° C. and run off slowly through a pipe line heated by hot water or steam dropping into about 10 parts of volume of 90% benzol. Recrystallization from the 90% benzol is then effected in the usual manner, but proceeds more smoothly as no emulsions or slimes are formed.

*Example 3*

Crude anthracene presscake as obtained by chilling and filtering a green oil fraction of coal tar is heated in a kettle to a temperature of 200–250° C. The water vapors leaving the kettle carry small amounts of solid hydrocarbons, which can be recovered by a treatment similar to that described in Examples 1 and 2. The still contents are run off through a pipe heated by hot oil, either in a jacket or in an internal pipe of smaller diameter than the kettle draw-off. The crude anthracene running off through the draw-off pipe is allowed to flow slowly into furfural which is continuously agitated in a suitable dissolver provided with efficient agitation. The amount of furfural is preferably 3–6 or 7 parts by volume per part of crude anthracene originally melted. The crystallization procedure is then continued in the usual manner, for example as described in the patent of A. O. Jaeger, No. 1,693,713 of December 4, 1928.

Instead of using furfural as a solvent, solvent naphtha, toluol, pyridine, pyridine oils, acetone oils, cyclohexane, cyclohexanol, or other solvents may be used. Where it is desired in the crystallization to remove carbazole as well as phenanthrene it is preferable to use furfural, acetone oil, cyclohexanol, cyclohexyl-acetate or pyridine. Where, however, phenanthrene only is to be removed the ordinary phenanthrene solvents such as solvent naphtha, toluene and the like may be used.

*Example 4*

A deep dehydrating kettle provided, if desired, with baffles or internal heating coils in baffle form to prevent free vertical circulation, is filled with the crude solid forerunnings of anthracene oil. The kettle is heated to 150° C. until all of the water has been removed. A valve in the draw-off pipe, which should be steam jacketed and led from the lowest point of the kettle is then opened sufficiently to permit the hot molten mixture to flow out into a dissolving vessel containing benzol or toluol, the flow being quite slow. Additional cold crude material is dropped continuously onto the top of the molten mixture, the addition of cold crude material and speed of draw-off being kept sufficiently low so that by the time any of the material has reached the bottom of the kettle it is completely dehydrated. Once started, the process is continuous.

*Example 5*

A dehydrating kettle as described in Example 4 is provided with a mineral oil heating system and filled with crude anthracene presscake. Heat is then turned on, and the crude anthracene heated to 200–250° C. and maintained at this temperature until completely dehydrated. Thereupon the dehydrated crude anthracene is gradually permitted to flow off into a dissolver containing orthodichlorbenzol or other known solvents and fresh crude anthracene is continually added at the top of the kettle as described in Example 4. The process operates continuously, and the draw-off and addition of fresh material is kept down to a point where the crude anthracene flowing off is completely dehydrated.

*Example 6*

A continuous anthracene dehydrator is operated as described in Example 5, but instead of continuously drawing off crude anthracene directly into a dissolving vessel it is drawn off into a hot storage tank kept at a temperature sufficiently high to maintain the mixture molten. From the storage tank the anthracene is drawn off from time to time into the dissolving vessels containing the solvent. This modification has some advantage as it is sometimes difficult to arrange a plant to take an overflow of dehydrated anthracene since some of the crystallization processes are batch processes. All the advantages of the present invention are, however, retained where the dehydrated material is stored at an elevated temperature, and the choice of a continuous process feeding directly into the crystallizing vessels or through an intermediate storage tank is purely one of operating convenience.

What is claimed as new is:

1. A method of purifying normally solid coal tar crude having a boiling point higher than that of water, which comprises subjecting the crude to a temperature sufficiently high to melt it and to dehydrate it, dissolving the molten, dehydrated material in a suitable solvent, and effecting purification by recrystallization from said solvent which has a selective solvent action on at least one of the main impurities of the crude material.

2. A method of purifying crude anthracene, which comprises subjecting the crude to a temperature sufficiently high to melt it and to dehydrate it, dissolving the molten, dehydrated material in a suitable solvent, and effecting purification by recrystallization from said solvent which has a selective solvent action on at least one of the main impurities of the crude material.

3. A method according to claim 1, in which the temperature of the molten crude at the time of introduction into the solvent is such that after completed solution the desired solution temperature is obtained.

4. A method according to claim 2, in which the temperature of the molten crude at the time of introduction into the solvent is such that after completed solution the desired solution temperature is obtained.

5. A method according to claim 1, in which the dehydration is effected continuously by maintaining a relatively large volume of material at the dehydrating temperature and continuously adding small amounts of the material to be dehydrated at one end of said mass while continuously withdrawing dehydrated material from the other end.

6. A method according to claim 2, in which the solvent is a furfural.

Signed at Pittsburgh, Pennsylvania, this 7th day of January, 1929.

ALPHONS O. JAEGER.
LLOYD C. DANIELS.